United States Patent
Lee (10) Patent No.: US 8,411,852 B2
(45) Date of Patent: Apr. 2, 2013

(54) DIFFUSION ORIENTED METHOD AND APPARATUS FOR STREAM CRYPTOGRAPHY

(76) Inventor: Chiou-Haun Lee, Taichung (TW)

( * ) Notice: Subject to any disclaimer, the term of this patent is extended or adjusted under 35 U.S.C. 154(b) by 460 days.

(21) Appl. No.: 12/765,881

(22) Filed: Apr. 23, 2010

(65) Prior Publication Data
US 2011/0261954 A1    Oct. 27, 2011

(51) Int. Cl.
*H04K 1/00*    (2006.01)
(52) U.S. Cl. ............... 380/28; 380/30; 380/37; 380/42; 713/189
(58) Field of Classification Search .............. 380/28, 380/30, 37, 42; 713/189; 708/401
See application file for complete search history.

(56) References Cited

U.S. PATENT DOCUMENTS

2007/0003060 A1*    1/2007    Lee ................. 380/259
2007/0189512 A1*    8/2007    Lee ................. 380/28

\* cited by examiner

*Primary Examiner* — Edward Zee
*Assistant Examiner* — Baotran N To (57) ABSTRACT

The present invention applies with a diffused mechanism, as such, a variable series of diffusion functions embedded within a diffusion-medium, to generate a maximum diffusion-cycle and nonlinear complexity; additionally, it performs in a serial process for simple design, further, in a parallel process for saving time, or even in a hardware architecture, to gain greater acceleration. FIG. 1 shows an embodiment of the present invention in flow chart diagram form, comprising steps of: selecting a diffusion-area A, a diffusion-medium S, and a diffusion mechanism $F^{t_1}$ 100; initializing A by an input password 200; performing $F^{t_1}$ to obtain a new value of A 300; inputting a plaintext in encryption or a ciphertext for decryption, bit by bit 400; XORing a plaintext bit in encryption or a ciphertext bit in decryption with a certain bit of A for stream output 500; continuing until completing the plaintext in encryption, or the ciphertext in decryption 600.

14 Claims, 5 Drawing Sheets

FIG. 6

DIFFUSION ORIENTED METHOD AND APPARATUS FOR STREAM CRYPTOGRAPHY

BACKGROUND OF THE INVENTION

1. Field of the Invention

The invention relates to a stream cryptographic method and apparatus therefor. More particularly, the invention relates to a diffusion mechanism for running stream cryptography bit by bit; other than the prior art with a fixed polynomial and Shift operations, the diffusion mechanism is combined flexibly with a variable series of diffusion functions embedded within a diffusion-medium control.

2. Description of the Related Art

The Applicant's following patent application is related to the invention and is incorporated herein by reference: "A Cryptographic Method of Multilayer Diffusion in Multidimension", application Ser. No. 12/726,833, filed Mar. 18, 2010; the prior invention described a diffusion function for one position $AF(p_1, p_2, \ldots, p_n)$, notated herein as $AF(i_1, i_2, \ldots, i_m) = A \oplus Ad_{1i} \oplus Ad_{2i} \oplus \ldots \oplus Ad_{mi} \oplus S$, the encryption/decryption is completed through a diffusion-cycle T, wherein $T = 2^{U+1}$, $U = \lceil \log_2 u \rceil$, $u = \max(d_1, d_2, \ldots, d_m)$, based on the dimensional magnitude.

The present invention emphasizes multiple diffusion functions at a series of pre-arranged positions to maximize the diffusion cycle. Other than the prior invention for one position, the notation $AF(p_1, p_2, \ldots, p_k)$ herein is for a series of pre-arranged positions; further, it may be described more delicately as or precisely by A performs the diffusion functions $F(p_1, p_2, \ldots, p_k)$.

SUMMARY OF THE INVENTION

The present invention applies with a diffused mechanism, as such, a variable series of diffusion functions embedded within a diffusion-medium, to generate a maximum diffusion-cycle and nonlinear complexity; additionally, it performs in a serial process for simple design, further, in a parallel process for saving time, or even in a hardware architecture, to gain greater acceleration. Under the combination of diffusion functions, the output bits, with a wide and flexible random distribution, are thus hardly attacked during the long diffusion-cycle; the steps are shown as follows:

(a) selecting a diffusion mechanism, a diffusion-area, and a diffusion-medium;
(b) setting an initial value of the diffusion-area by an input password;
(c) running the diffusion mechanism to obtain a new value for the diffusion-area;
(d) inputting a bit of a plaintext/ciphertext stream in sequence;
(e) outputting a bit of the ciphertext/plaintext stream, equally, XORing (exclusive-or (XOR) operation) the bit of the plaintext/ciphertext stream with an assigned bit of the diffusion-area;
(f) going back to Step (c) until the encryption/decryption is complete.

DETAILED DESCRIPTION OF THE PREFERRED EMBODIMENTS

Figure 1:
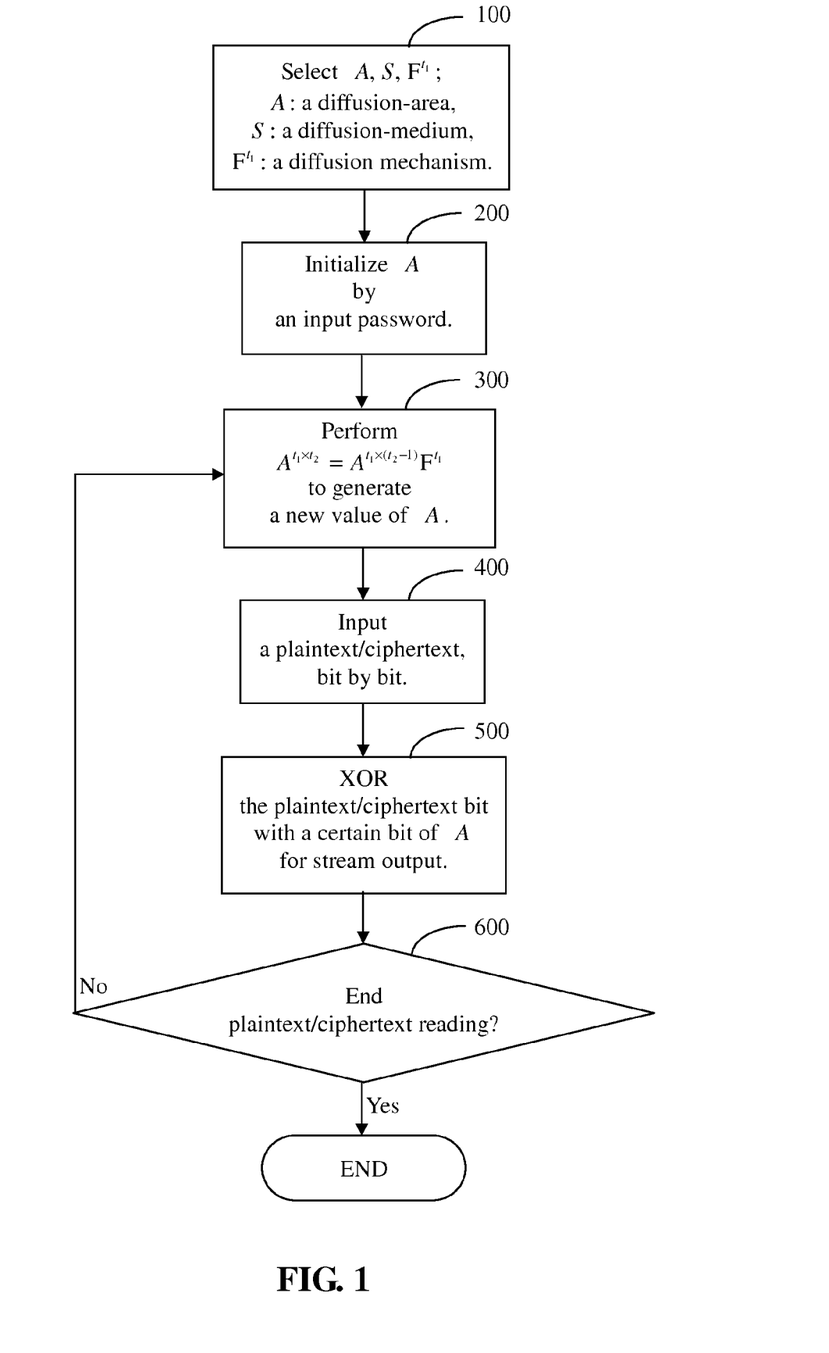
FIG. 1 is a summary flow chart diagram showing the main steps taken while encrypting/decrypting by a diffusion mechanism according to the present invention.

FIG. 1 shows an embodiment of the present invention in flow chart diagram form, comprising steps of: selecting a diffusion-area A, a diffusion-medium S, and a diffusion mechanism $F^{t_1}$ 100; initializing A by an input password 200; performing $F^{t_1}$ to obtain a new value of A 300; inputting a plaintext in encryption or a ciphertext for decryption, bit by bit 400; XORing a plaintext bit in encryption or a ciphertext bit in decryption with a certain bit of A for stream output 500; continuing until completing the plaintext in encryption, or the ciphertext in decryption 600.

Figure 2:
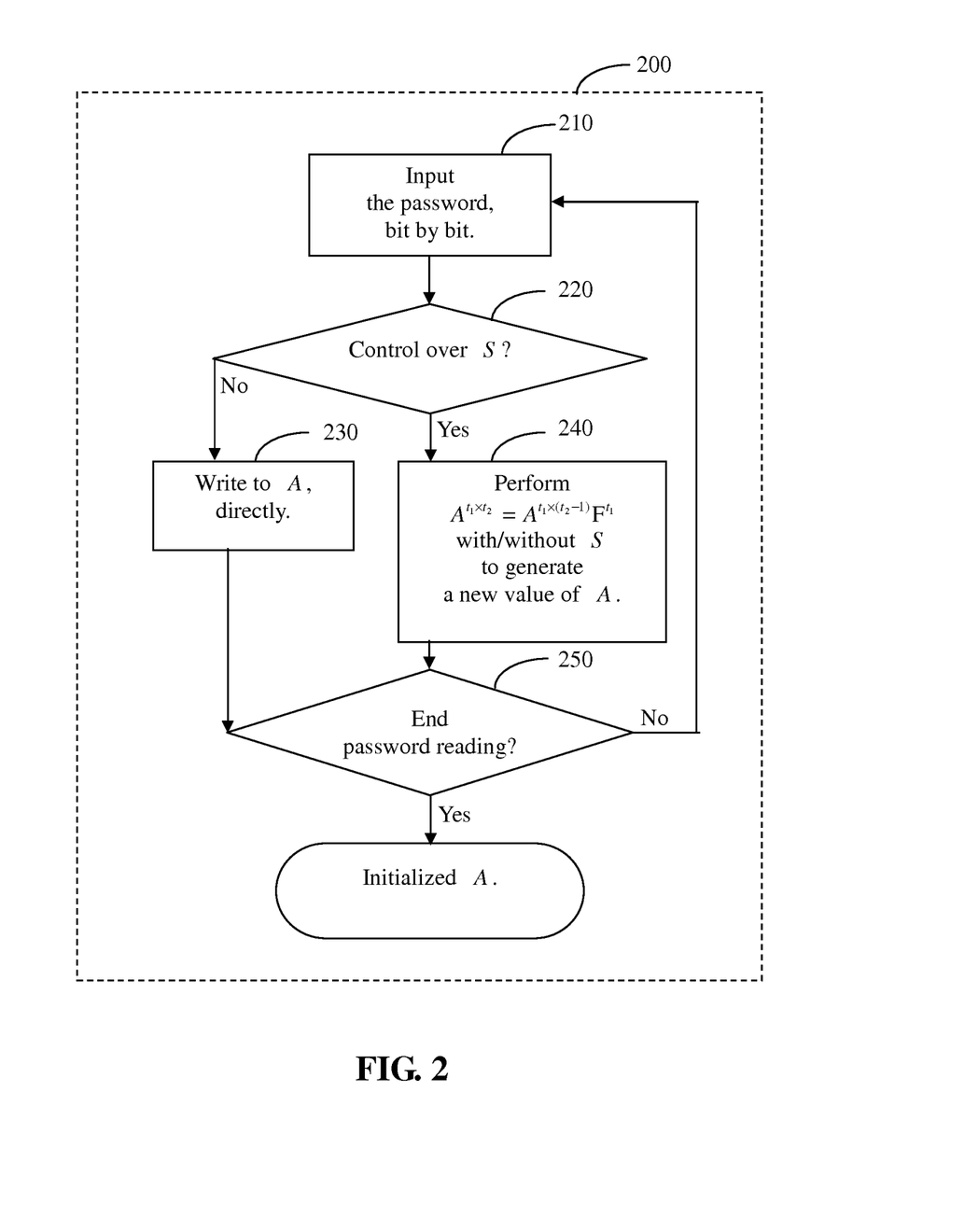
FIG. 2 is a summary flow chart diagram of FIG. 1, 200 showing the steps taken while initializing by an input password according to the present invention.

Moreover, FIG. 2, i.e. FIG. 1, 200, shows an initialization of the diffusion-area by an input password, comprising steps of: inputting the password, bit by bit 210; setting the password bit whether controlling over S 220, if yes, then performing $F^{t_1}$ whether adding S by the value (0 or 1) of the password bit, to obtain a new value of A 240, otherwise, writing the password bit directly to A 230; continuing until completing the password 250.

Serial Process in Detail:

FIG. 1, 300, obtaining a new value $A^{t_1 \times t_2} = A^{t_1 \times (t_2-1)} F^{t_1}$ by a serial process, it would implement a number of diffusion functions $F(p_1, p_2, \ldots, p_k)$, provided with a simple design but rather time consuming. Furthermore, for the initialization of A, FIG. 2, a password bit selects a first value for $AF(p) = A \oplus Ad_{1i} \oplus Ad_{2i} \oplus \ldots \oplus Ad_{mi} \oplus S$, and a second value for $AF(p) = A \oplus Ad_{1i} \oplus Ad_{2i} \oplus \ldots \oplus Ad_{mi}$. The cryptographic process flow comprises steps of:

1. choosing a diffusion-area A, with a diffusion mechanism $F^{t_1}$;
2. setting A's initial value $A^0$ by a password; $t_2 = 1$;
3. obtaining a new value $A^{t_1 \times t_2}$, wherein $A^{t_1 \times t_2} = A^{t_1 \times (t_2-1)} F^{t_1}$;
4. inputting a bit of a plaintext/ciphertext stream in sequence;
5. outputting a bit of the ciphertext/plaintext stream, equally, XORing the bit of the plaintext/ciphertext stream with an assigned bit of $A^{t_1 \times t_2}$;
6. letting $t_2 = t_2 + 1$, going back to Step 3, until the encryption/decryption is complete.

Symbols and Definitions:
   A: a diffusion-area, wherein A is a $d_1 \times d_2 \times \ldots \times d_m$ binary matrix with a combination of positions labeled sequentially from 1 to n, accordingly, the bit values from $a_1$ to $a_n$; where the positions are shown as below:
for example, (a) $m = 1$, one-dimension A

| 1 | 2 | 3 | ... | n−1 | n |
|---|---|---|-----|-----|---|

(b) $m = 2$, two-dimension A

| 1 | i+1 | ... | n−i+1 |
|---|-----|-----|-------|
| 2 | i+2 | ... | n−i+2 |
| ⋮ | ⋮ | ⋮ | ⋮ |
| i | 2i | ... | n |

S: a diffusion-medium, wherein S is a m-dimensional binary matrix, and further, includes an anchor-position Ṡ.

AF(p): A performs a diffusion function F(p), see application Ser. No. 12/726,833, Point-Diffusion, wherein p transforms into m-dimension coordinates $(i_1, i_2, \ldots, i_m)$, then $AF(p)=A \oplus Ad_{1i} \oplus Ad_{2i} \oplus \ldots \oplus Ad_{mi} \oplus S$.

$AF(p_1, p_2, \ldots, p_k)$: A performs the diffusion functions $F(p_1, p_2, \ldots, p_k)$, sequentially at the m-dimension positions $p_1, p_2, \ldots, p_k$.

$AF^{t_1}$: A performs a diffusion mechanism $F^{t_1}$, as abbreviated for $F(p_1, p_2^{t_1}, \ldots, p_k)$, i.e. $F(p_1, p_2, \ldots, p_k)$ repeated $t_1$ times.

Preferred Embodiment I: a 1×16 Diffusion-Area A, a Diffusion Mechanism $F^1$.

Suppose that $F^1=F(13, 14, 15, 16, 1, \ldots, 13)$ applied to A, further, $A^0=0$, and S=1 placed at the anchor-position, with the encrypting value $A^{1 \times 1}=A^0F^1$ at the first time, $t_2=1$. To detail the diffusion function of every position, the sequential positions are notated as no. p: no. q in abbreviation thereafter, for example 13:15 for 13,14,15, or 13:1 for 13,14,15,16,1, and so on; the steps are listed as follows (S=1 is indicated in boldface hereafter):

$A^0F(p)=A^0 \oplus A^0y_p \oplus S$;
$A^0F(13)=[0000000000000000] \oplus [0000000000000000] \oplus [0000000000001000]$;
$A^0F(13:14)=[0000000000001000] \oplus [0000000000010000] \oplus [0000000000000100]$;
$A^0F(13:15)=[0000000000011100] \oplus [0000000000111000] \oplus [0000000000000010]$;
$A^0F(13:16)=[0000000000100110] \oplus [0000000001001100] \oplus [0000000000000001]$;
$A^0F(13:1)=[0000000001101011] \oplus [0000000000110101] \oplus [1000000000000000]$;
$A^0F(13:2)=[1000000001011110] \oplus [0000000000101111] \oplus [0100000000000000]$;
$A^0F(13:3)=[1100000001110001] \oplus [1000000000111000] \oplus [0010000000000000]$;
$A^0F(13:4)=[0110000001001001] \oplus [1100000000100100] \oplus [0001000000000000]$;
$A^0F(13:5)=[1011000001101101] \oplus [0110000000110110] \oplus [0000100000000000]$;
$A^0F(13:6)=[1101100001011011] \oplus [1011000000101101] \oplus [0000010000000000]$;
$A^0F(13:7)=[0110110001110110] \oplus [1101100000111011] \oplus [0000001000000000]$;
$A^0F(13:8)=[1011011001001101] \oplus [0110110000100110] \oplus [0000000100000000]$;
$A^0F(13:9)=[1101101101101011] \oplus [1011011000101101] \oplus [0000000010000000]$;
$A^0F(13:10)=[0110110111011110] \oplus [1101101110101111] \oplus [0000000001000000]$;
$A^0F(13:11)=[1011011000110001] \oplus [0110110001011000] \oplus [0000000000100000]$;
$A^0F(13:12)=[1101101001001001] \oplus [1011010010000100] \oplus [0000000000010000]$;
$A^0F(13:13)=[0110111011011101] \oplus [1101110110110110] \oplus [0000000000001000]$.

Through $A^0F(13:13)$, thus, $A^{1 \times 1}=[1011001101100011]$, afterward, XORing a bit of A, assuming $a_{16}$, with a plaintext bit to output an encrypted bit. Next, let $t_2=2$, and the value $A^{1 \times 2}$ is thus derived from $A^{1 \times 1}$ which can be equivalently notated as $A^1$ in abbreviation hereafter; the details are shown as below:

$A^1F(p)=A^1 \oplus A^1y_p \oplus S$;
$A^1F(13)=[1011001101100011] \oplus [0110011011000001] \oplus [0000000000001000]$;
$A^1F(13:14)=[1101010110101010] \oplus [1010101101010001] \oplus [0000000000000100]$;
$A^1F(13:15)=[0111111011111111] \oplus [1111110111111101] \oplus [0000000000000010]$;
$A^1F(13:16)=[1000001100000000] \oplus [0000011000000000] \oplus [0000000000000001]$;
$A^1F(13:1)=[1000010100000001] \oplus [0100001010000000] \oplus [1000000000000000]$;
$A^1F(13:2)=[0100011110000001] \oplus [1010001111000000] \oplus [0100000000000000]$;
$A^1F(13:3)=[1010010001000001] \oplus [0101001000100000] \oplus [0010000000000000]$;
$A^1F(13:4)=[1101011001100001] \oplus [1010101100110000] \oplus [0001000000000000]$;
$A^1F(13:5)=[0110110101010001] \oplus [1101011010101000] \oplus [0000100000000000]$;
$A^1F(13:6)=[1011001111111001] \oplus [0110000111111100] \oplus [0000010000000000]$;
$A^1F(13:7)=[1101011000000101] \oplus [1010110100000010] \oplus [0000001000000000]$;
$A^1F(13:8)=[0111100100000111] \oplus [1111001010000011] \oplus [0000000100000000]$;
$A^1F(13:9)=[1000101010000100] \oplus [0001010101000010] \oplus [0000000010000000]$;
$A^1F(13:10)=[1001111101000110] \oplus [0011111010100011] \oplus [0000000001000000]$;
$A^1F(13:11)=[1010000110100101] \oplus [0100001101010010] \oplus [0000000000100000]$;
$A^1F(13:12)=[1111000101010111] \oplus [1100010110101011] \oplus [0000000000010000]$;
$A^1F(13:13)=[0010011101101100] \oplus [0100110110110110] \oplus [0000000000001000]$.

The second value of the diffusion-area $A^{1 \times 2}=[0110100110110010]$; then, another encrypted bit is generated. Accordingly, a diffusion-cycle of $F^1$, implying $A^{1 \times t_2}=A^1$, requires $2^{16}-1$ times; thus, running the diffusion mechanism consecutively through the diffusion-cycle, the encrypted data complies with a random distribution thereby avoiding successful crypto-attack; assume a plaintext stream=0, four segments (64 bits) of the random output are appended as below, as samples:

Four Segments: ($t_2$=1 to 64)
   1011011100111011 ($t_2$=1 to 16), 0000100100010111 ($t_2$=17 to 32),
   0100000011010100 ($t_2$=33 to 48), 1011011111111110 ($t_2$=49 to 64).

Preferred Embodiment II: a 1×16 Diffusion-Area A, a Diffusion Mechanism $F^2$.

According to a diffusion mechanism arranged with the same positions in sequence, but at different times, the output is sampled out at every corresponding time. Suppose that $F^2=F(13^2:13) A^0=[0000000000000000]$ and $S=1$ is placed at the anchor-position, the encrypting value $A^{2\times 1}$ thus is obtained from $A^{2\times 0}F^2$ at the first time, $t_2=1$, see $A^2$ of Embodiment I, short for $A^{2\times 1}$. The next value $A^{2\times 2}$, notated as $A^4$ for short, is thus obtained by running the diffusion functions of the value $A^3$; the steps are also listed as below to let any skilled person gain more understanding: ($A^3=[1000010001101011]$)
$A^3F(p)=A^3\oplus A^3 y_p \oplus S$;
$A^3F(13)=[1000010001101011]\oplus[0000100011010101]\oplus$
 [0000000000001000];
$A^3F(13:14)=[1000110010110110]\oplus[0001100101101011]$
 $\oplus[0000000000000100]$;
$A^3F(13:15)=[1001010111011001]\oplus[0010101110110000]$
 $\oplus[0000000000000010]$;
$A^3F(13:16)=[1011111001101011]\oplus[0111110011010110]$
 $\oplus[0000000000000001]$;
$A^3F(13:1)=[1100001010111100]\oplus[0110000101011110]\oplus$
 [1000000000000000];
$A^3F(13:2)=[0010001111100010]\oplus[0001000111110001]\oplus$
 [0100000000000000];
$A^3F(13:3)=[0111001000010011]\oplus[1101100100001001]\oplus$
 [0010000000000000];
$A^3F(13:4)=[1000101100011010]\oplus[0000010110001101]\oplus$
 [0001000000000000];
$A^3F(13:5)=[1001110100010111]\oplus[0011011101001011]\oplus$
 [0000100000000000];
$A^3F(13:6)=[1010000111011100]\oplus[0100000011101110]\oplus$
 [0000010000000000];
$A^3F(13:7)=[1110010100110010]\oplus[1100100010011001]\oplus$
 [0000001000000000];
$A^3F(13:8)=[0010111110101011]\oplus[0101110110101010]\oplus$
 [0000000100000000];
$A^3F(13:9)=[0111000001111110]\oplus[1110000001111111]\oplus$
 [0000000010000000];
$A^3F(13:10)=[1001000011000001]\oplus[0010000110100000]$
 $\oplus[0000000001000000]$;
$A^3F(13:11)=[1011000100100001]\oplus[0110001001010000]$
 $\oplus[0000000000100000]$;
$A^3F(13:12)=[1101001101010001]\oplus[1010011010101000]$
 $\oplus[0000000000010000]$;
$A^3F(13:13)=[0111010111101001]\oplus[1110101111010100]$
 $\oplus[0000000000001000]$.

The new value of the diffusion-area will be $A^{2\times 2}=$ [1001111000110101]. According to the diffusion mechanism using the number of times "2" is a prime number, therefore, the diffusion-cycle still keeps on $2^{16}-1$ times; thus, also assume a plaintext stream=0, XORing $a_{16}$ of A, the output other than Embodiment I is sampled out every two times; with four fragments of the random output appended as below, as samples:

Four Segments: ($t_2=1$ to 64)
 0111010100010111 ($t_2=1$ to 16), 1000111001111110 ($t_2=17$ to 32),
 1000010100011110 ($t_2=33$ to 48), 1101011100000100 ($t_2=49$ to 64).

Preferred Embodiment III: a 4×4 Diffusion-Area A, a Diffusion Mechanism $F^1$.

Provided that $F^1=F(8:8)$, $A^0=[0000000000000000]$ and $S=1$ placed at the anchor-position, the encrypting value $A^{1\times 1}$ is obtained from $A^{1\times 0}$ run by $F^1$ at the first time, $t=1$. Now that the diffusion-area is a two-dimension matrix, a position needs to be transformed to the corresponding coordinates $(i, j)$; the details are shown as below ($Ax(0)$, $Ay(0)$ also indicated in boldface hereafter):

$$AF(p) = A \oplus Ax_i \oplus Ay_j \oplus S;$$

$$AF(8) = A \oplus Ax_4 \oplus Ay_2 \oplus S$$
$$= \begin{bmatrix}0000\\0000\\0000\\0000\end{bmatrix} \oplus \begin{bmatrix}0000\\0000\\0000\\0000\end{bmatrix} \oplus \begin{bmatrix}0000\\0000\\0000\\0000\end{bmatrix} \oplus \begin{bmatrix}0000\\0000\\0000\\0100\end{bmatrix}$$
$$= \begin{bmatrix}0000\\0000\\0000\\0100\end{bmatrix};$$

$$AF(8:9) = A \oplus Ax_1 \oplus Ay_3 \oplus S$$
$$= \begin{bmatrix}0000\\0000\\0000\\0100\end{bmatrix} \oplus \begin{bmatrix}0000\\0000\\0000\\0000\end{bmatrix} \oplus \begin{bmatrix}0000\\0000\\0000\\1000\end{bmatrix} \oplus \begin{bmatrix}0010\\0000\\0000\\0000\end{bmatrix}$$
$$= \begin{bmatrix}0010\\0000\\0000\\1100\end{bmatrix};$$

$$AF(8:10) = A \oplus Ax_2 \oplus Ay_3 \oplus S$$
$$= \begin{bmatrix}0010\\0000\\0000\\1100\end{bmatrix} \oplus \begin{bmatrix}0000\\0000\\0000\\0000\end{bmatrix} \oplus \begin{bmatrix}0101\\0000\\0000\\1000\end{bmatrix} \oplus \begin{bmatrix}0000\\0010\\0000\\0000\end{bmatrix}$$
$$= \begin{bmatrix}0111\\0010\\0000\\0100\end{bmatrix};$$

$$AF(8:11) = A \oplus Ax_3 \oplus Ay_3 \oplus S$$
$$= \begin{bmatrix}0111\\0010\\0000\\0100\end{bmatrix} \oplus \begin{bmatrix}0010\\0000\\0000\\0000\end{bmatrix} \oplus \begin{bmatrix}1101\\0101\\0000\\1000\end{bmatrix} \oplus \begin{bmatrix}0000\\0000\\0010\\0000\end{bmatrix}$$
$$= \begin{bmatrix}1000\\0111\\0010\\1100\end{bmatrix};$$

$$AF(8:12) = A \oplus Ax_4 \oplus Ay_3 \oplus S$$
$$= \begin{bmatrix}1000\\0111\\0010\\1100\end{bmatrix} \oplus \begin{bmatrix}0111\\0010\\1100\\0000\end{bmatrix} \oplus \begin{bmatrix}0000\\1101\\0101\\1000\end{bmatrix} \oplus \begin{bmatrix}0000\\0000\\0000\\0010\end{bmatrix}$$
$$= \begin{bmatrix}1111\\1000\\1011\\0110\end{bmatrix};$$

$$AF(8:13) = A \oplus Ax_1 \oplus Ay_4 \oplus S$$
$$= \begin{bmatrix} 1111 \\ 1000 \\ 1011 \\ 0110 \end{bmatrix} \oplus \begin{bmatrix} 0000 \\ 1111 \\ 1000 \\ 1011 \end{bmatrix} \oplus \begin{bmatrix} 1110 \\ 0000 \\ 0110 \\ 1100 \end{bmatrix} \oplus \begin{bmatrix} 0001 \\ 0000 \\ 0000 \\ 0000 \end{bmatrix}$$
$$= \begin{bmatrix} 0000 \\ 0111 \\ 0101 \\ 0001 \end{bmatrix};$$

$$AF(8:14) = A \oplus Ax_2 \oplus Ay_4 \oplus S$$
$$= \begin{bmatrix} 0000 \\ 0111 \\ 0101 \\ 0001 \end{bmatrix} \oplus \begin{bmatrix} 0111 \\ 0000 \\ 0111 \\ 0101 \end{bmatrix} \oplus \begin{bmatrix} 0000 \\ 1110 \\ 1010 \\ 0010 \end{bmatrix} \oplus \begin{bmatrix} 0000 \\ 0001 \\ 0000 \\ 0000 \end{bmatrix}$$
$$= \begin{bmatrix} 0111 \\ 1000 \\ 1000 \\ 0110 \end{bmatrix};$$

$$AF(8:15) = A \oplus Ax_3 \oplus Ay_4 \oplus S$$
$$= \begin{bmatrix} 0111 \\ 1000 \\ 1000 \\ 0110 \end{bmatrix} \oplus \begin{bmatrix} 1000 \\ 1000 \\ 0000 \\ 1000 \end{bmatrix} \oplus \begin{bmatrix} 1110 \\ 0000 \\ 0000 \\ 1100 \end{bmatrix} \oplus \begin{bmatrix} 0000 \\ 0000 \\ 0001 \\ 0000 \end{bmatrix}$$
$$= \begin{bmatrix} 0001 \\ 0000 \\ 1001 \\ 0010 \end{bmatrix};$$

$$AF(8:16) = A \oplus Ax_4 \oplus Ay_4 \oplus S$$
$$= \begin{bmatrix} 0001 \\ 0000 \\ 1001 \\ 0010 \end{bmatrix} \oplus \begin{bmatrix} 0000 \\ 1001 \\ 0010 \\ 0000 \end{bmatrix} \oplus \begin{bmatrix} 0010 \\ 0000 \\ 0010 \\ 0100 \end{bmatrix} \oplus \begin{bmatrix} 0000 \\ 0000 \\ 0000 \\ 0001 \end{bmatrix}$$
$$= \begin{bmatrix} 0011 \\ 1001 \\ 1001 \\ 0111 \end{bmatrix};$$

$$AF(8:1) = A \oplus Ax_1 \oplus Ay_1 \oplus S$$
$$= \begin{bmatrix} 0011 \\ 1001 \\ 1001 \\ 0111 \end{bmatrix} \oplus \begin{bmatrix} 0000 \\ 0011 \\ 1001 \\ 1001 \end{bmatrix} \oplus \begin{bmatrix} 0001 \\ 0100 \\ 0100 \\ 0011 \end{bmatrix} \oplus \begin{bmatrix} 1000 \\ 0000 \\ 0000 \\ 0000 \end{bmatrix}$$
$$= \begin{bmatrix} 1010 \\ 1110 \\ 0100 \\ 1101 \end{bmatrix};$$

$$AF(8:2) = A \oplus Ax_2 \oplus Ay_1 \oplus S$$
$$= \begin{bmatrix} 1010 \\ 1110 \\ 0100 \\ 1101 \end{bmatrix} \oplus \begin{bmatrix} 1110 \\ 0000 \\ 1110 \\ 0100 \end{bmatrix} \oplus \begin{bmatrix} 0101 \\ 0111 \\ 0010 \\ 0110 \end{bmatrix} \oplus \begin{bmatrix} 0000 \\ 1000 \\ 0000 \\ 0000 \end{bmatrix}$$
$$= \begin{bmatrix} 0001 \\ 0001 \\ 1000 \\ 1111 \end{bmatrix};$$

$$AF(8:3) = A \oplus Ax_3 \oplus Ay_1 \oplus S$$
$$= \begin{bmatrix} 0001 \\ 0001 \\ 1000 \\ 1111 \end{bmatrix} \oplus \begin{bmatrix} 0001 \\ 1000 \\ 0000 \\ 1000 \end{bmatrix} \oplus \begin{bmatrix} 0000 \\ 0000 \\ 0100 \\ 0111 \end{bmatrix} \oplus \begin{bmatrix} 0000 \\ 0000 \\ 1000 \\ 0000 \end{bmatrix}$$
$$= \begin{bmatrix} 0000 \\ 1001 \\ 0100 \\ 0000 \end{bmatrix};$$

$$AF(8:4) = A \oplus Ax_4 \oplus Ay_1 \oplus S$$
$$= \begin{bmatrix} 0000 \\ 1001 \\ 0100 \\ 0000 \end{bmatrix} \oplus \begin{bmatrix} 1001 \\ 0100 \\ 0000 \\ 0000 \end{bmatrix} \oplus \begin{bmatrix} 0000 \\ 0100 \\ 0010 \\ 0000 \end{bmatrix} \oplus \begin{bmatrix} 0000 \\ 0000 \\ 0000 \\ 1000 \end{bmatrix}$$
$$= \begin{bmatrix} 1001 \\ 1001 \\ 0110 \\ 1000 \end{bmatrix};$$

$$AF(8:5) = A \oplus Ax_1 \oplus Ay_2 \oplus S$$
$$= \begin{bmatrix} 1001 \\ 1001 \\ 0110 \\ 1000 \end{bmatrix} \oplus \begin{bmatrix} 0000 \\ 1001 \\ 1001 \\ 0110 \end{bmatrix} \oplus \begin{bmatrix} 0000 \\ 0000 \\ 1011 \\ 0000 \end{bmatrix} \oplus \begin{bmatrix} 0100 \\ 0000 \\ 0000 \\ 0000 \end{bmatrix}$$
$$= \begin{bmatrix} 1101 \\ 0000 \\ 0100 \\ 1110 \end{bmatrix};$$

$$AF(8:6) = A \oplus Ax_2 \oplus Ay_2 \oplus S$$
$$= \begin{bmatrix} 1101 \\ 0000 \\ 0100 \\ 1110 \end{bmatrix} \oplus \begin{bmatrix} 0000 \\ 0000 \\ 0000 \\ 0100 \end{bmatrix} \oplus \begin{bmatrix} 1010 \\ 0000 \\ 1010 \\ 1011 \end{bmatrix} \oplus \begin{bmatrix} 0000 \\ 0100 \\ 0000 \\ 0000 \end{bmatrix}$$
$$= \begin{bmatrix} 0111 \\ 0100 \\ 1110 \\ 0001 \end{bmatrix};$$

-continued $$AF(8:7) = A \oplus Ax_3 \oplus Ay_2 \oplus S$$

$$= \begin{bmatrix} 0111 \\ 0100 \\ 1110 \\ 0001 \end{bmatrix} \oplus \begin{bmatrix} 0100 \\ 1110 \\ 0000 \\ 1110 \end{bmatrix} \oplus \begin{bmatrix} 1011 \\ 1010 \\ 1011 \\ 0000 \end{bmatrix} \oplus \begin{bmatrix} 0000 \\ 0000 \\ 0100 \\ 0000 \end{bmatrix}$$

$$= \begin{bmatrix} 1000 \\ 0000 \\ 0001 \\ 1111 \end{bmatrix};$$

$$AF(8:8) = A \oplus Ax_4 \oplus Ay_2 \oplus S$$

$$= \begin{bmatrix} 1000 \\ 0000 \\ 0001 \\ 1111 \end{bmatrix} \oplus \begin{bmatrix} 0000 \\ 0001 \\ 1111 \\ 0000 \end{bmatrix} \oplus \begin{bmatrix} 0000 \\ 0000 \\ 0000 \\ 1011 \end{bmatrix} \oplus \begin{bmatrix} 0000 \\ 0000 \\ 0000 \\ 0100 \end{bmatrix}$$

$$= \begin{bmatrix} 1000 \\ 0001 \\ 1110 \\ 0000 \end{bmatrix}.$$

Assume again the last bit of $A^{1 \times t_2}$ for encrypting and a plaintext stream=0, due to a two-dimension diffusion mechanism, four fragments of the random output, which are thus very different from samples obtained for Embodiment I & II, are appended as below:

Four Segments: ($t_2$=1 to 64)

0111000100100111 ($t_2$=1 to 16), 0000001100001011 ($t_2$=17 to 32), 1110101001111110 ($t_2$=33 to 48), 0011000001101100 ($t_2$=49 to 64).

Parallel Process in Detail:

FIG. 1, 300, obtaining a new value $A^{t_1 \times t_2} = A^{t_1 \times (t_2-1)} F^{t_1}$ by a parallel process, it would transform the serial process into $A^{t_1 \times t_2} = A^{t_1 \times (t_2-1)} F^{t_1} \oplus BF^{t_1}$ namely, by running a diffusion-table $F^{t_1}$ and a medium-constant $BF^{t_1}$, through a slightly complicated design but with the concomitant advantage of shortening the time required. Furthermore, for the initialization of A, FIG. 2, a password bit selects a first value for $A^{t_1 \times t_2} = A^{t_1 \times (t_2-1)} F^{t_1} \oplus BF^{t_1}$, and a second value for $A^{t_1 \times t_2} = A^{t_1 \times (t_2-1)} F^{t_1}$.

The cryptographic process flow comprises steps of:

1. choosing a diffusion-area A, creating a diffusion-table $F^{t_1}$;
2. choosing a medium-area B, creating a medium-constant $BF^{t_1}$;
3. setting A's initial value $A^0$ by a password; $t_2$=1;
4. obtaining a new value $A^{t_1 \times t_2}$, wherein $A^{t_1 \times t_2} = A^{t_1 \times (t_2-1)} F^{t_1} \oplus BF^{t_1}$;
5. inputting a bit of a plaintext/ciphertext stream in sequence;
6. outputting a bit of the ciphertext/plaintext stream, equally, XORing the bit of the plaintext/ciphertext stream with an assigned bit of $A^{t_1 \times t_2}$;
7. letting $t_2 = t_2 + 1$, going back to Step 4, until the encryption/decryption is complete.

Symbols and Definitions:

A: a diffusion-area, wherein A contains an initial value $A^0$ and further, is a $d_1 \times d_2 \times \ldots \times d_m$ binary matrix with a combination of positions labeled sequentially from 1 to n, accordingly, the bit values from $a_1$ to $a_n$.

S: a diffusion-medium, wherein S is a m-dimensional binary matrix, and further, includes an anchor-position $\dot{S}$.

B: a medium-area, wherein B is a $d_1 \times d_2 \times \ldots \times d_m$ zero matrix with a combination of positions labeled sequentially from 1 to n.

$BF^{t_1}$: a medium-constant, wherein B performs a diffusion mechanism $F^{t_1}$ once, as abbreviated for $F(p_1, p_2^{t_1}, \ldots, p_k)$, i.e. $F(p_1, p_2, \ldots, p_k)$ repeated $t_1$ times.

$AF^{t_1}$: A performs a diffusion-table $F^{t_1}$, wherein $F^{t_1} = FF(p_1, p_2^{t_1}, \ldots, p_k)$ performed once, comprising of:

F is a zero matrix with $d_1 \times d_2 \times \ldots \times d_m$ plus one dimension with magnitude of $d_1 \times d_2 \times \ldots \times d_m$, called layers, equally; in addition, 1's are at the $i^{th}$ position on the $i^{th}$ layer; for example, (a) a $4 \times 4 F = \begin{bmatrix} 1000 \\ 0100 \\ 0010 \\ 0001 \end{bmatrix}$, (b) a $2 \times 2 \times 4 F = \overset{1st}{\begin{bmatrix} 1 & 0 \\ 0 & 0 \end{bmatrix}} \overset{2nd}{\begin{bmatrix} 0 & 0 \\ 1 & 0 \end{bmatrix}} \overset{3rd}{\begin{bmatrix} 0 & 1 \\ 0 & 0 \end{bmatrix}} \overset{4th}{\begin{bmatrix} 0 & 0 \\ 0 & 1 \end{bmatrix}}$;

(c) a $4 \times 4 \times 16 F =$ $$\overset{1st}{\begin{bmatrix} 1000 \\ 0000 \\ 0000 \\ 0000 \end{bmatrix}} \overset{2nd}{\begin{bmatrix} 0000 \\ 1000 \\ 0000 \\ 0000 \end{bmatrix}} \overset{3rd}{\begin{bmatrix} 0000 \\ 0000 \\ 1000 \\ 0000 \end{bmatrix}} \overset{4th}{\begin{bmatrix} 0000 \\ 0000 \\ 0000 \\ 1000 \end{bmatrix}} \ldots \overset{13th}{\begin{bmatrix} 0001 \\ 0000 \\ 0000 \\ 0000 \end{bmatrix}} \overset{14th}{\begin{bmatrix} 0000 \\ 0001 \\ 0000 \\ 0000 \end{bmatrix}} \overset{15th}{\begin{bmatrix} 0000 \\ 0000 \\ 0001 \\ 0000 \end{bmatrix}} \overset{16th}{\begin{bmatrix} 0000 \\ 0000 \\ 0000 \\ 0001 \end{bmatrix}};$$

wherein a $1 \times 4$ A is applied with the $4 \times 4$ F; a $2 \times 2$ A is applied with the $2 \times 2 \times 4$ F; further, a $4 \times 4$ A is applied with the $4 \times 4 \times 16$ F; and so on.

$FF(p_1, p_2, \ldots, p_k)$: F performs the diffusion functions $F(p_1, p_2, \ldots, p_k)$, sequentially at the m-dimension positions $p_1, p_2, \ldots, p_k$; for example, a $1 \times 4$ A applied with the $4 \times 4$ F, $FF(p) = F \oplus Fy_p$, $FF(1:4)$ as follows ($Fy(0)$ indicated in boldface hereafter):

$$FF(1) = \begin{bmatrix} 1000 \\ 0100 \\ 0010 \\ 0001 \end{bmatrix} \oplus \begin{bmatrix} 0100 \\ 0010 \\ 0001 \\ 0000 \end{bmatrix} = \begin{bmatrix} 1100 \\ 0110 \\ 0011 \\ 0001 \end{bmatrix};$$

$$FF(1:2) = \begin{bmatrix} 1100 \\ 0110 \\ 0011 \\ 0001 \end{bmatrix} \oplus \begin{bmatrix} 1010 \\ 1011 \\ 0001 \\ 0000 \end{bmatrix} = \begin{bmatrix} 0110 \\ 1101 \\ 0010 \\ 0001 \end{bmatrix};$$

$$FF(1:3) = \begin{bmatrix} 0110 \\ 1101 \\ 0010 \\ 0001 \end{bmatrix} \oplus \begin{bmatrix} 1101 \\ 1000 \\ 0101 \\ 0000 \end{bmatrix} = \begin{bmatrix} 1011 \\ 0101 \\ 0111 \\ 0001 \end{bmatrix};$$

$$FF(1:4) = \begin{bmatrix} 1011 \\ 0101 \\ 0111 \\ 0001 \end{bmatrix} \oplus \begin{bmatrix} 0110 \\ 1010 \\ 1110 \\ 0010 \end{bmatrix} = \begin{bmatrix} 1101 \\ 1111 \\ 1001 \\ 0011 \end{bmatrix}.$$

Suppose $AF^1$, with the diffusion-table $F^1 = FF(1:4)$, so according to the above derivation, the next $a_1 = a_1 \oplus a_2 \oplus a_3$, see 1's at the first position on every layer, the $i^{th}$ layer represented for current $a_i$; thus referring the second position on every layer, the next $a_2 = a_1 \oplus a_2$; further, $a_3 = a_2 \oplus a_4$; finally, $a_4 = a_1 \oplus a_2 \oplus a_3 \oplus a_4$.

Moreover, a 2×2 A applied with the 2×2×4 F, FF(p)=F⊕Fx$_j$⊕Fy$_j$, FF(1:4) as follows (Fx(0) also indicated in boldface hereafter):

$$FF(1) = F \oplus Fx_1 \oplus Fy_1$$

$$= \begin{bmatrix} \overset{1st}{\begin{bmatrix}1 & 0\\0 & 0\end{bmatrix}} & \overset{2nd}{\begin{bmatrix}0 & 0\\1 & 0\end{bmatrix}} & \overset{3rd}{\begin{bmatrix}0 & 1\\0 & 0\end{bmatrix}} & \overset{4th}{\begin{bmatrix}0 & 0\\0 & 1\end{bmatrix}} \end{bmatrix} \oplus$$

$$\begin{bmatrix} \overset{1st}{\begin{bmatrix}0 & 0\\1 & 0\end{bmatrix}} & \overset{2nd}{\begin{bmatrix}0 & 0\\0 & 0\end{bmatrix}} & \overset{3rd}{\begin{bmatrix}0 & 0\\0 & 1\end{bmatrix}} & \overset{4th}{\begin{bmatrix}0 & 0\\0 & 0\end{bmatrix}} \end{bmatrix} \oplus$$

$$\begin{bmatrix} \overset{1st}{\begin{bmatrix}0 & 1\\0 & 0\end{bmatrix}} & \overset{2nd}{\begin{bmatrix}0 & 0\\0 & 1\end{bmatrix}} & \overset{3rd}{\begin{bmatrix}0 & 0\\0 & 0\end{bmatrix}} & \overset{4th}{\begin{bmatrix}0 & 0\\0 & 0\end{bmatrix}} \end{bmatrix};$$

$$FF(1:2) = [FF(1)] \oplus [FF(1)]x_2 \oplus [FF(1)]y_1$$

$$= \begin{bmatrix} \overset{1st}{\begin{bmatrix}1 & 1\\1 & 0\end{bmatrix}} & \overset{2nd}{\begin{bmatrix}0 & 0\\1 & 1\end{bmatrix}} & \overset{3rd}{\begin{bmatrix}0 & 1\\0 & 1\end{bmatrix}} & \overset{4th}{\begin{bmatrix}0 & 0\\0 & 1\end{bmatrix}} \end{bmatrix} \oplus$$

$$\begin{bmatrix} \overset{1st}{\begin{bmatrix}1 & 0\\0 & 0\end{bmatrix}} & \overset{2nd}{\begin{bmatrix}1 & 1\\0 & 0\end{bmatrix}} & \overset{3rd}{\begin{bmatrix}0 & 1\\0 & 0\end{bmatrix}} & \overset{4th}{\begin{bmatrix}0 & 1\\0 & 0\end{bmatrix}} \end{bmatrix} \oplus$$

$$\begin{bmatrix} \overset{1st}{\begin{bmatrix}0 & 1\\0 & 1\end{bmatrix}} & \overset{2nd}{\begin{bmatrix}0 & 0\\0 & 1\end{bmatrix}} & \overset{3rd}{\begin{bmatrix}0 & 0\\0 & 0\end{bmatrix}} & \overset{4th}{\begin{bmatrix}0 & 0\\0 & 0\end{bmatrix}} \end{bmatrix};$$

$$FF(1:3) = [FF(1:2)] \oplus [FF(1:2)]x_1 \oplus [FF(1:2)]y_2$$

$$= \begin{bmatrix} \overset{1st}{\begin{bmatrix}0 & 0\\1 & 1\end{bmatrix}} & \overset{2nd}{\begin{bmatrix}1 & 1\\1 & 0\end{bmatrix}} & \overset{3rd}{\begin{bmatrix}0 & 0\\0 & 1\end{bmatrix}} & \overset{4th}{\begin{bmatrix}0 & 1\\0 & 1\end{bmatrix}} \end{bmatrix} \oplus$$

$$\begin{bmatrix} \overset{1st}{\begin{bmatrix}0 & 0\\0 & 0\end{bmatrix}} & \overset{2nd}{\begin{bmatrix}0 & 0\\1 & 1\end{bmatrix}} & \overset{3rd}{\begin{bmatrix}0 & 0\\0 & 0\end{bmatrix}} & \overset{4th}{\begin{bmatrix}0 & 1\\0 & 1\end{bmatrix}} \end{bmatrix} \oplus$$

$$\begin{bmatrix} \overset{1st}{\begin{bmatrix}0 & 0\\1 & 0\end{bmatrix}} & \overset{2nd}{\begin{bmatrix}1 & 0\\0 & 0\end{bmatrix}} & \overset{3rd}{\begin{bmatrix}0 & 0\\1 & 0\end{bmatrix}} & \overset{4th}{\begin{bmatrix}1 & 0\\1 & 0\end{bmatrix}} \end{bmatrix};$$

$$FF(1:4) = [FF(1:3)] \oplus [FF(1:3)]x_2 \oplus [FF(1:3)]y_2$$

$$= \begin{bmatrix} \overset{1st}{\begin{bmatrix}0 & 0\\0 & 1\end{bmatrix}} & \overset{2nd}{\begin{bmatrix}0 & 1\\0 & 1\end{bmatrix}} & \overset{3rd}{\begin{bmatrix}0 & 0\\1 & 1\end{bmatrix}} & \overset{4th}{\begin{bmatrix}0 & 1\\1 & 0\end{bmatrix}} \end{bmatrix} \oplus$$

$$\begin{bmatrix} \overset{1st}{\begin{bmatrix}0 & 1\\0 & 0\end{bmatrix}} & \overset{2nd}{\begin{bmatrix}0 & 1\\0 & 0\end{bmatrix}} & \overset{3rd}{\begin{bmatrix}1 & 1\\0 & 0\end{bmatrix}} & \overset{4th}{\begin{bmatrix}1 & 0\\0 & 0\end{bmatrix}} \end{bmatrix} \oplus$$

$$\begin{bmatrix} \overset{1st}{\begin{bmatrix}0 & 0\\1 & 0\end{bmatrix}} & \overset{2nd}{\begin{bmatrix}1 & 0\\1 & 0\end{bmatrix}} & \overset{3rd}{\begin{bmatrix}0 & 0\\1 & 0\end{bmatrix}} & \overset{4th}{\begin{bmatrix}1 & 0\\0 & 0\end{bmatrix}} \end{bmatrix}.$$

Suppose $AF^1$, wherein $$F^1 = FF(1:4) = \begin{bmatrix} \overset{1st}{\begin{bmatrix}0 & 1\\1 & 1\end{bmatrix}} & \overset{2nd}{\begin{bmatrix}1 & 0\\1 & 1\end{bmatrix}} & \overset{3rd}{\begin{bmatrix}1 & 1\\0 & 1\end{bmatrix}} & \overset{4th}{\begin{bmatrix}1 & 1\\1 & 0\end{bmatrix}} \end{bmatrix};$$

four layers represent the current $a_1$ to $a_4$, through by the first position, the next $a_1=a_2 \oplus a_3 \oplus a_4$; by the second position, the next $a_2=a_1 \oplus a_2 \oplus a_4$; further, by the third position, the next $a_3=a_1 \oplus a_3 \oplus a_4$; and finally, by the fourth position, the next $a_4=a_1 \oplus a_2 \oplus a_3$.

Preferred Embodiment IV: Diffusion Mechanisms in a Parallel Process.

Firstly, in Embodiment I, now that the diffusion mechanism $F^1=F(13:13)$, $A^0=[0000000000000000]$, and $S=1$ placed at the anchor-position, the sequential value of diffusion-area $A^{1 \times t_2}=A^{1 \times (t_2-1)}F^1 \oplus BF^1$, wherein a medium-constant $BF^1$ and a diffusion-table $F^1$ are performed only once at the beginning; $BF^1=BF(13:13)=[1011001101100011]$, derived as $A^1$, in Embodiment I, and further, $F^1=FF(13:13)$, wherein $FF(p)=F \oplus Fy_p$, may refer to the whole derivation of two-dimensional FF(1:4), and F is such as a 16×16 unit matrix, with a one-dimension diffusion function in a two-dimension matrix; positions are orderly ordered from 13 to 16 then from 1 to 13, each position's diffusion function is shown in Table 1, and for greater clarity, the final result is shown in Table 2. Furthermore, reading from the $i^{th}$ position of all layers, namely, referring to the $i^{th}$ column to obtain the next $a_i$, all combinations are shown in Table 3.

Therefore, according to Table 3, new values in sequence as below:

for $t_2 = 1$, $$A^{1 \times 1} = A^0 F^1 \oplus BF^1$$
$$= [0000000000000000] \oplus$$
$$[1011001101100011];$$

the results is the same as $A^1$ in Embodiment I.

for $t_2 = 2$, $$A^{1 \times 2} = A^{1 \times 1} F^1 \oplus BF^1$$
$$= [1101101011010001] \oplus [1011001101100011]$$
$$= 0110100110110010;$$

the results is the same as $A^2$ in Embodiment I.

Derivation of $A^{1 \times 1} F^1$:

Now that $$A^{1 \times 1} = [a_1, a_2, \ldots, a_{16}]$$
$$= \begin{bmatrix} 1 & 2 & 3 & 4 & 5 & 6 & 7 & 8 & 9 & 10 & 11 & 12 & 13 & 14 & 15 & 16 \\ 1 & 0 & 1 & 1 & 0 & 0 & 1 & 1 & 0 & 1 & 1 & 0 & 0 & 0 & 1 & 1 \end{bmatrix};$$

the next $a_1 = a_1 \oplus a_7 \oplus a_9 \oplus a_{11} = 1 \oplus 1 \oplus 0 \oplus 1 = 1$;

the next $$a_2 = a_1 \oplus a_2 \oplus a_5 \oplus a_8 \oplus a_{10} \oplus a_{12}$$
$$= 1 \oplus 0 \oplus 0 \oplus 1 \oplus 1 \oplus 0 = 1; \ldots;$$

the next $a_{16} = a_3 \oplus a_4 \oplus a_{13} \oplus a_{15} = 1 \oplus 1 \oplus 0 \oplus 1 = 1$.

Prove likewise, for $t_2 = 3$, $$A^{1 \times 2} = [a_1, a_2, \ldots, a_{16}]$$
$$= \begin{bmatrix} 1 & 2 & 3 & 4 & 5 & 6 & 7 & 8 & 9 & 10 & 11 & 12 & 13 & 14 & 15 & 16 \\ 0 & 1 & 1 & 0 & 1 & 0 & 0 & 1 & 1 & 0 & 1 & 1 & 0 & 0 & 1 & 0 \end{bmatrix};$$

$$A^{1 \times 3} = A^{1 \times 2} F^1 \oplus BF^1$$
$$= [0011011100001000] \oplus [1011001101100011]$$
$$= 1000010001101011;$$

the result is the same as $A^3$ in Embodiment II.

for $t_2 = 4$, $$A^{1 \times 3} = [a_1, a_2, \ldots, a_{16}]$$
$$= \begin{bmatrix} 1 & 2 & 3 & 4 & 5 & 6 & 7 & 8 & 9 & 10 & 11 & 12 & 13 & 14 & 15 & 16 \\ 1 & 0 & 0 & 0 & 0 & 1 & 0 & 0 & 0 & 1 & 1 & 0 & 1 & 0 & 1 & 1 \end{bmatrix};$$

$$A^{1 \times 4} = A^{1 \times 3} F^1 \oplus BF^1$$
$$= [0010110101010110] \oplus [1011001101100011]$$
$$= 1001111000110101;$$

the result is the same as $A^4$ in Embodiment II.

TABLE 1

$$FF(13) = \begin{bmatrix} 1000000000000000 \\ \vdots \\ 0000000000010000 \\ 0000000000001000 \\ 0000000000000100 \\ 0000000000000010 \\ 0000000000000001 \end{bmatrix} \oplus \begin{bmatrix} 0000000000000000 \\ \vdots \\ 0000000000100000 \\ 0000000000010100 \\ 0000000000000010 \\ 0000000000000001 \\ 0000000000000000 \end{bmatrix} = \begin{bmatrix} 1000000000000000 \\ \vdots \\ 0000000000110000 \\ 0000000000011100 \\ 0000000000000110 \\ 0000000000000011 \\ 0000000000000001 \end{bmatrix};$$

$$FF(13:14) = \begin{bmatrix} 1000000000000000 \\ \vdots \\ 0000000000110000 \\ 0000000000011100 \\ 0000000000000110 \\ 0000000000000011 \\ 0000000000000001 \end{bmatrix} \oplus \begin{bmatrix} 0000000000000000 \\ \vdots \\ 0000000001100000 \\ 0000000000111010 \\ 0000000000001011 \\ 0000000000000001 \\ 0000000000000000 \end{bmatrix} = \begin{bmatrix} 1000000000000000 \\ \vdots \\ 0000000001010000 \\ 0000000000100110 \\ 0000000000001101 \\ 0000000000000010 \\ 0000000000000001 \end{bmatrix};$$

$$FF(13:13) = \begin{bmatrix} 1011011011011000 \\ \vdots \\ 0011001100110000 \\ 0000101101110110 \\ 0000000010101100 \\ 0000000000001001 \\ 0000000000000011 \end{bmatrix} \oplus \begin{bmatrix} 0110110110110100 \\ \vdots \\ 0110011001100000 \\ 0001011011100011 \\ 0000000101010110 \\ 0000000000010100 \\ 0000000000000001 \end{bmatrix} = \begin{bmatrix} 1101101101101100 \\ \vdots \\ 0101010101010000 \\ 0001110110010101 \\ 0000000111111010 \\ 0000000000011101 \\ 0000000000000010 \end{bmatrix}.$$

TABLE 2

$$F^1 = FF(13:13) = \begin{bmatrix} 1 & 1 & 0 & 1 & 1 & 0 & 1 & 1 & 0 & 1 & 1 & 0 & 1 & 1 & 0 & 0 \\ 0 & 1 & 0 & 0 & 0 & 1 & 0 & 1 & 0 & 0 & 0 & 1 & 0 & 1 & 1 & 0 \\ 0 & 0 & 0 & 1 & 1 & 0 & 1 & 0 & 1 & 0 & 1 & 1 & 0 & 0 & 1 & 1 \\ 0 & 0 & 0 & 0 & 0 & 1 & 0 & 1 & 0 & 1 & 0 & 1 & 0 & 0 & 0 & 1 \\ 0 & 1 & 1 & 0 & 1 & 1 & 0 & 0 & 0 & 1 & 1 & 1 & 0 & 0 & 0 & 0 \\ 0 & 0 & 0 & 1 & 0 & 1 & 0 & 0 & 0 & 0 & 0 & 1 & 0 & 0 & 0 & 0 \\ 1 & 0 & 1 & 1 & 0 & 0 & 0 & 1 & 1 & 0 & 1 & 1 & 0 & 0 & 0 & 0 \\ 0 & 1 & 0 & 1 & 0 & 0 & 0 & 0 & 0 & 1 & 0 & 1 & 0 & 0 & 0 & 0 \\ 1 & 0 & 1 & 0 & 1 & 0 & 1 & 1 & 0 & 1 & 1 & 1 & 0 & 0 & 0 & 0 \\ 0 & 1 & 0 & 1 & 0 & 1 & 0 & 1 & 0 & 0 & 0 & 1 & 0 & 0 & 0 & 0 \\ 1 & 0 & 1 & 0 & 1 & 0 & 1 & 0 & 1 & 0 & 1 & 1 & 0 & 0 & 0 & 0 \\ 0 & 1 & 0 & 1 & 0 & 1 & 0 & 1 & 0 & 1 & 0 & 1 & 0 & 0 & 0 & 0 \\ 0 & 0 & 0 & 1 & 1 & 1 & 0 & 1 & 1 & 0 & 0 & 1 & 0 & 1 & 0 & 1 \\ 0 & 0 & 0 & 0 & 0 & 0 & 1 & 1 & 1 & 1 & 1 & 1 & 1 & 0 & 1 & 0 \\ 0 & 0 & 0 & 0 & 0 & 0 & 0 & 0 & 0 & 0 & 1 & 1 & 1 & 1 & 0 & 1 \\ 0 & 0 & 0 & 0 & 0 & 0 & 0 & 0 & 0 & 0 & 0 & 0 & 0 & 0 & 1 & 0 \end{bmatrix}$$

TABLE 3

| at time $t_2$ | at time $t_2 - 1$ |
|---|---|
| $a_1$ | $a_1 \oplus a_7 \oplus a_9 \oplus a_{11}$ |
| $a_2$ | $a_1 \oplus a_2 \oplus a_5 \oplus a_8 \oplus a_{10} \oplus a_{12}$ |
| $a_3$ | $a_5 \oplus a_7 \oplus a_9 \oplus a_{11}$ |
| $a_4$ | $a_1 \oplus a_3 \oplus a_6 \oplus a_7 \oplus a_8 \oplus a_{10} \oplus a_{12} \oplus a_{13}$ |
| $a_5$ | $a_1 \oplus a_3 \oplus a_5 \oplus a_9 \oplus a_{11} \oplus a_{13}$ |
| $a_6$ | $a_2 \oplus a_4 \oplus a_5 \oplus a_6 \oplus a_{10} \oplus a_{12} \oplus a_{13}$ |
| $a_7$ | $a_1 \oplus a_3 \oplus a_9 \oplus a_{11}$ |
| $a_8$ | $a_1 \oplus a_2 \oplus a_4 \oplus a_7 \oplus a_9 \oplus a_{10} \oplus a_{12} \oplus a_{13} \oplus a_{14}$ |

TABLE 3-continued

| at time $t_2$ | at time $t_2 - 1$ |
|---|---|
| $a_9$ | $a_3 \oplus a_7 \oplus a_{11} \oplus a_{13} \oplus a_{14}$ |
| $a_{10}$ | $a_1 \oplus a_4 \oplus a_5 \oplus a_8 \oplus a_9 \oplus a_{12} \oplus a_{14}$ |
| $a_{11}$ | $a_1 \oplus a_3 \oplus a_5 \oplus a_7 \oplus a_9 \oplus a_{11} \oplus a_{14}$ |
| $a_{12}$ | $a_2 \oplus a_3 \oplus a_4 \oplus a_5 \oplus a_6 \oplus a_7 \oplus a_8 \oplus a_9 \oplus a_{10} \oplus a_{11} \oplus a_{12} \oplus a_{13} \oplus a_{14} \oplus a_{15}$ |
| $a_{13}$ | $a_1 \oplus a_{14} \oplus a_{15}$ |
| $a_{14}$ | $a_1 \oplus a_2 \oplus a_{13} \oplus a_{15}$ |
| $a_{15}$ | $a_2 \oplus a_3 \oplus a_{14} \oplus a_{16}$ |
| $a_{16}$ | $a_3 \oplus a_4 \oplus a_{13} \oplus a_{15}$ |

Secondly, with Embodiment II, to comply with the diffusion mechanism $F^2=F(13^2:13)$, the sequential value $A^{2 \times t_2}=A^{2 \times (t_2-1)}F^2 \oplus BF^2$, wherein $BF^2=[BF(13:13)]F(13:13)$, is derived as $A^2$, in Embodiment I, equals to [0110100110110010], and further, $F^2=FF(13^2:13)$, wherein a value FF(13:13), see Table 2, performs the diffusion functions F(13:13), derived as Table 1; the diffusion-table $F^2$ is shown in Table 4.

TABLE 4

| at time $t_2$ | at time $t_2 - 1$ |
|---|---|
| $a_1$ | $a_1 \oplus a_3 \oplus a_5 \oplus a_7 \oplus a_9 \oplus a_{13}$ |
| $a_2$ | $a_1 \oplus a_2 \oplus a_4 \oplus a_6 \oplus a_7 \oplus a_8 \oplus a_9 \oplus a_{10} \oplus a_{11} \oplus a_{13} \oplus a_{14} \oplus a_{15}$ |
| $a_3$ | $a_1 \oplus a_9$ |
| $a_4$ | $a_1 \oplus a_2 \oplus a_{10} \oplus a_{13}$ |
| $a_5$ | $a_3 \oplus a_5 \oplus a_{11} \oplus a_{14} \oplus a_{15}$ |
| $a_6$ | $a_1 \oplus a_2 \oplus a_3 \oplus a_4 \oplus a_5 \oplus a_6 \oplus a_9 \oplus a_{12} \oplus a_{14}$ |
| $a_7$ | $a_9 \oplus a_{13}$ |

TABLE 4-continued

| at time $t_2$ | at time $t_2 - 1$ |
|---|---|
| $a_8$ | $a_1 \oplus a_2 \oplus a_5 \oplus a_{10} \oplus a_{15}$ |
| $a_9$ | $a_2 \oplus a_9 \oplus a_{11} \oplus a_{13}$ |
| $a_{10}$ | $a_1 \oplus a_2 \oplus a_7 \oplus a_{10} \oplus a_{12} \oplus a_{14}$ |
| $a_{11}$ | $a_1 \oplus a_2 \oplus a_5 \oplus a_9 \oplus a_{13} \oplus a_{15}$ |
| $a_{12}$ | $a_1 \oplus a_3 \oplus a_5 \oplus a_6 \oplus a_9 \oplus a_{10} \oplus a_{13} \oplus a_{14} \oplus a_{15} \oplus a_{16}$ |
| $a_{13}$ | $a_3 \oplus a_7 \oplus a_9 \oplus a_{11} \oplus a_{13} \oplus a_{14} \oplus a_{15} \oplus a_{16}$ |
| $a_{14}$ | $a_1 \oplus a_3 \oplus a_5 \oplus a_7 \oplus a_8 \oplus a_9 \oplus a_{10} \oplus a_{11} \oplus a_{12} \oplus a_{15} \oplus a_{16}$ |
| $a_{15}$ | $a_3 \oplus a_4 \oplus a_7 \oplus a_8 \oplus a_9 \oplus a_{10} \oplus a_{11} \oplus a_{12}$ |
| $a_{16}$ | $a_2 \oplus a_5 \oplus a_6 \oplus a_8 \oplus a_9 \oplus a_{10} \oplus a_{11} \oplus a_{12} \oplus a_{13} \oplus a_{15} \oplus a_{16}$ |

Therefore, according to Table 4, new values in sequence as below:

for $t_2 = 1$, $$A^{2\times1} = A^0 F^2 \oplus BF^2$$
$$= [0000000000000000] \oplus [0110100110110010];$$

the results is the same as $A^1$ in Embodiment $I$.

for $t_2 = 2$, $$A^{2\times2} = A^{2\times1} F^2 \oplus BF^2$$
$$= [1111011110000111] \oplus [0110100110110010]$$
$$= 1001111000110101;$$

the results is the same as $A^4$ in Embodiment $II$.

Derivation of $A^{2\times1} F^2$:

Now that $$A^{2\times1} = [a_1, a_2, \ldots, a_{16}]$$
$$= \begin{bmatrix} 1 & 2 & 3 & 4 & 5 & 6 & 7 & 8 & 9 & 10 & 11 & 12 & 13 & 14 & 15 & 16 \\ 0 & 1 & 1 & 0 & 1 & 0 & 0 & 1 & 1 & 0 & 1 & 1 & 0 & 0 & 1 & 0 \end{bmatrix};$$

the next $$a_1 = a_1 \oplus a_3 \oplus a_5 \oplus a_7 \oplus a_9 \oplus a_{13} = 0 \oplus 1 \oplus 1 \oplus 0 \oplus 1 \oplus 0 = 1;$$

the next $$a_2 = a_1 \oplus a_2 \oplus a_4 \oplus a_6 \oplus a_7 \oplus a_8 \oplus a_9 \oplus a_{10} \oplus a_{11} \oplus a_{13} \oplus a_{14} \oplus a_{15}$$
$$= 0 \oplus 1 \oplus 0 \oplus 0 \oplus 0 \oplus 1 \oplus 1 \oplus 0 \oplus 1 \oplus 0 \oplus 0 \oplus 1$$
$$= 1; \ldots;$$

the next $$a_{16} = a_2 \oplus a_5 \oplus a_6 \oplus a_8 \oplus a_9 \oplus a_{10} \oplus a_{11} \oplus a_{12} \oplus a_{13} \oplus a_{15} \oplus a_{16}$$
$$= 1 \oplus 1 \oplus 0 \oplus 1 \oplus 1 \oplus 0 \oplus 1 \oplus 1 \oplus 0 \oplus 1 \oplus 0 = 1.$$

Thirdly, in Embodiment III, now that A is a 4×4 matrix, thus, the F will be a 4×4×16 zero matrix, further, 1's at the $i^{th}$ position on the $i^{th}$ layer; the diffusion function $F(p) = F \oplus Fx_i \oplus Fy_j$, may refer to the whole derivation of three-dimensional FF(1:4). According to the diffusion mechanism $F^1 = F(8:8)$, the sequential value of diffusion-area $A^{1 \times t_2} = A^{1 \times (t_2-1)} F^1 \oplus BF^1$, wherein $BF^1 = BF(8:8) = [1010001000100100]$, derived as $A^1$, Embodiment III, and $F^1 = FF(8:8)$ is shown in Table 5.

TABLE 5

| at time $t_2$ | at time $t_2 - 1$ |
|---|---|
| $a_1$ | $a_1 \oplus a_4 \oplus a_5 \oplus a_6 \oplus a_9 \oplus a_{11} \oplus a_{12} \oplus a_{16}$ |
| $a_2$ | $a_4 \oplus a_5 \oplus a_6 \oplus a_{11} \oplus a_{12} \oplus a_{13} \oplus a_{15}$ |
| $a_3$ | $a_1 \oplus a_2 \oplus a_7 \oplus a_8 \oplus a_{10} \oplus a_{12} \oplus a_{13} \oplus a_{14}$ |

TABLE 5-continued

| at time $t_2$ | at time $t_2 - 1$ |
|---|---|
| $a_4$ | $a_1 \oplus a_8 \oplus a_9 \oplus a_{11} \oplus a_{12} \oplus a_{15}$ |
| $a_5$ | $a_1 \oplus a_5 \oplus a_6 \oplus a_9 \oplus a_{10} \oplus a_{12} \oplus a_{13} \oplus a_{14} \oplus a_{15} \oplus a_{16}$ |
| $a_6$ | $a_2 \oplus a_3 \oplus a_4 \oplus a_5 \oplus a_7 \oplus a_8 \oplus a_9 \oplus a_{11} \oplus a_{14} \oplus a_{16}$ |
| $a_7$ | $a_3 \oplus a_8 \oplus a_9 \oplus a_{12} \oplus a_{15} \oplus a_{16}$ |
| $a_8$ | $a_1 \oplus a_2 \oplus a_3 \oplus a_5 \oplus a_7 \oplus a_{12} \oplus a_{13} \oplus a_{15} \oplus a_{16}$ |
| $a_9$ | $a_1 \oplus a_2 \oplus a_3 \oplus a_4 \oplus a_5 \oplus a_8 \oplus a_9 \oplus a_{13} \oplus a_{14} \oplus a_{15} \oplus a_{16}$ |
| $a_{10}$ | $a_3 \oplus a_5 \oplus a_8 \oplus a_{10} \oplus a_{12} \oplus a_{13} \oplus a_{14}$ |
| $a_{11}$ | $a_2 \oplus a_3 \oplus a_4 \oplus a_7 \oplus a_9 \oplus a_{11} \oplus a_{12} \oplus a_{15}$ |
| $a_{12}$ | $a_2 \oplus a_3 \oplus a_5 \oplus a_6 \oplus a_8 \oplus a_{10} \oplus a_{11} \oplus a_{13} \oplus a_{14}$ |
| $a_{13}$ | $a_2 \oplus a_3 \oplus a_4 \oplus a_5 \oplus a_8 \oplus a_{10} \oplus a_{12} \oplus a_{13} \oplus a_{14} \oplus a_{15} \oplus a_{16}$ |
| $a_{14}$ | $a_4 \oplus a_6 \oplus a_7 \oplus a_8 \oplus a_9 \oplus a_{11} \oplus a_{13} \oplus a_{14}$ |
| $a_{15}$ | $a_1 \oplus a_4 \oplus a_8 \oplus a_9 \oplus a_{10} \oplus a_{13}$ |
| $a_{16}$ | $a_1 \oplus a_2 \oplus a_4 \oplus a_5 \oplus a_6 \oplus a_{10} \oplus a_{12} \oplus a_{15} \oplus a_{16}$ |

Figure 3A:
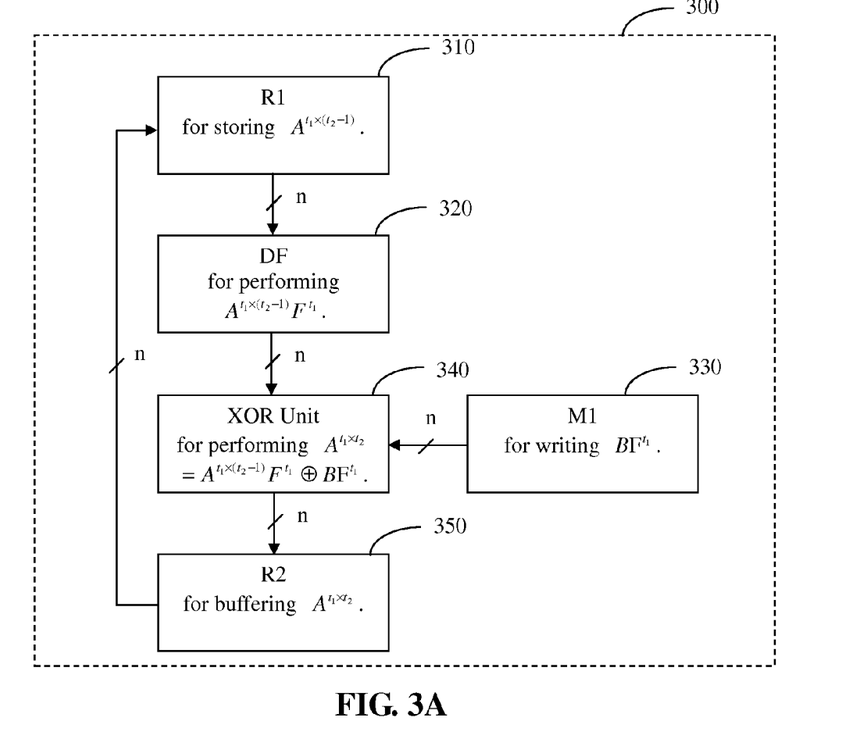
FIG. 3A is a summary flow chart diagram showing the component steps taken while performing a diffusion mechanism including a medium-constant in hardware architecture according to the present invention.

Hardware Architecture in Detail:

FIG. 1, 300, obtaining a new value $A^{t_1 \times t_2} = A^{t_1 \times (t_2-1)} F^{t_1}$ in a hardware architecture, would transform $A^{t_1 \times t_2} = A^{t_1 \times (t_2-1)} F^{t_1} \oplus BF^{t_1}$ in a parallel process into a first circuit design shown as FIG. 3A, comprising of: a first register R1 provided for storing an input value $A^{t_1 \times (t_2-1)}$ 310; a diffuser DF provided for receiving $A^{t_1 \times (t_2-1)}$ from R1, further, recombining $A^{t_1 \times (t_2-1)}$ with a function-table $F^{t_1}$ and transmitting an output value $A^{t_1 \times (t_2-1)}_1 F^{t_1}$ 320; a first memory M1 provided for writing a medium-constant $BF^{t_1}$ 330; an XOR Unit provided for receiving $A^{t_1 \times (t_2-1)} F^{t_1}$ from DF as a first operand, $BF^{t_1}$ from M1 as a second operand, then, performing a bitwise XOR operation and transmitting an output value $A^{t_1 \times t_2}$ 340; a second register R2 provided for buffering $A^{t_1 \times t_2}$ from said XOR Unit, and feeding back said $A^{t_1 \times t_2}$ to R1 350.

Figure 3B:
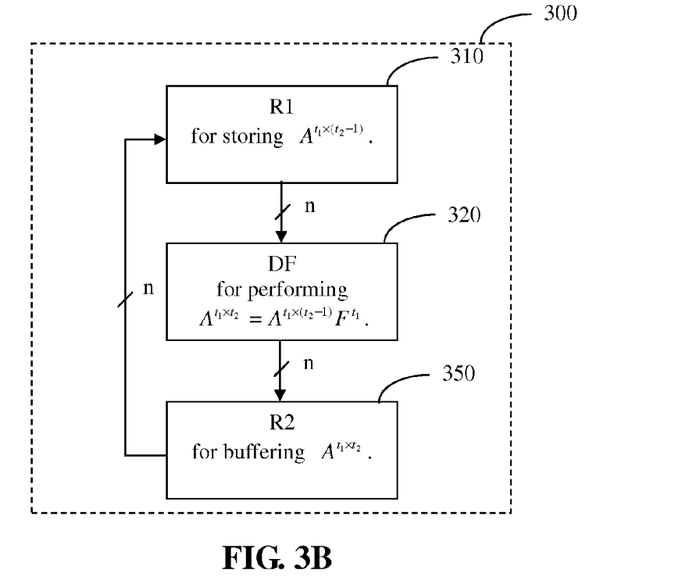
FIG. 3B is a summary flow chart diagram showing the component steps taken while performing a diffusion mechanism excluding a medium-constant in hardware architecture according to the present invention.

In addition, for the initialization of A, FIG. 2, a password bit selects a first value for $A^{t_1 \times t_2} = A^{t_1 \times (t_2-1)} F^{t_1} \oplus BF^{t_1}$ as by the above architecture, and a second value for $A^{t_1 \times t_2} = A^{t_1 \times (t_2-1)} F^{t_1}$ shown as FIG. 3B as a second design of FIG. 1, 300, comprising of: a first register R1 provided for storing an input value $A^{t_1 \times (t_2-1)}$ 310; a diffuser DF provided for receiving $A^{t_1 \times (t_2-1)}$ from R1, further, recombining $A^{t_1 \times (t_2-1)}$ with a function-table $F^{t_1}$ and transmitting an output value $A^{t_1 \times t_2}$ 320; a second register R2 provided for buffering $A^{t_1 \times t_2}$ from DF, and feeding back said $A^{t_1 \times t_2}$ to R1 350.

Figure 3C:
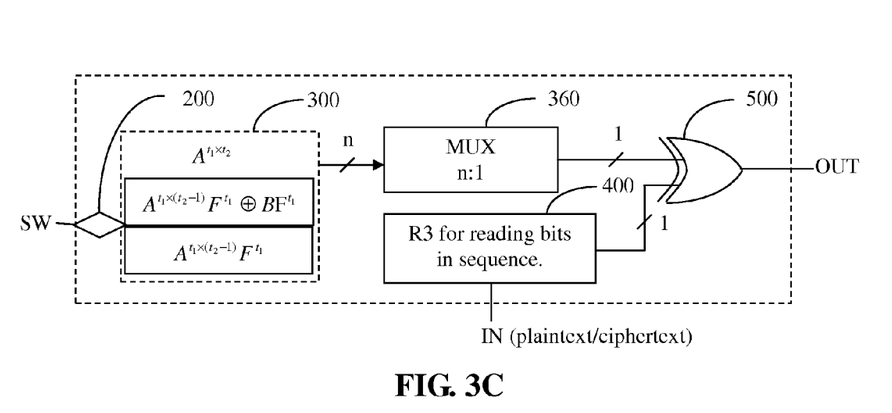
FIG. 3C is a summary flow chart diagram showing the component steps taken while encrypting/decrypting by a diffusion mechanism in hardware architecture according to the present invention.

The whole scheme is shown as FIG. 3C, a main component, provided for performing a diffusion mechanism 300, as FIG. 1, 300, i.e. FIGS. 3A and 3B; in addition, a switch SW, provided for receiving an input password for initialization 200, as FIG. 1, 200; further comprising of: a multiplexer MUX provided for receiving $A^{t_1 \times t_2}$ from R2, further, selecting a bit of $A^{t_1 \times t_2}$ and transmitting the assigned bit 360; a third register R3 provided for storing a stream plaintext/ciphertext in sequence and transmitting a bit each time 400, as FIG. 1, 400; an XOR gate provided for receiving said assigned bit from MUX as a first operand, said bit from R3 as a second operand, then, performing an XOR operation and transmitting an output bit 500, as FIG. 1, 500.

Preferred Embodiment V: Diffusion Mechanisms in Hardware Architecture.

Figure 4:
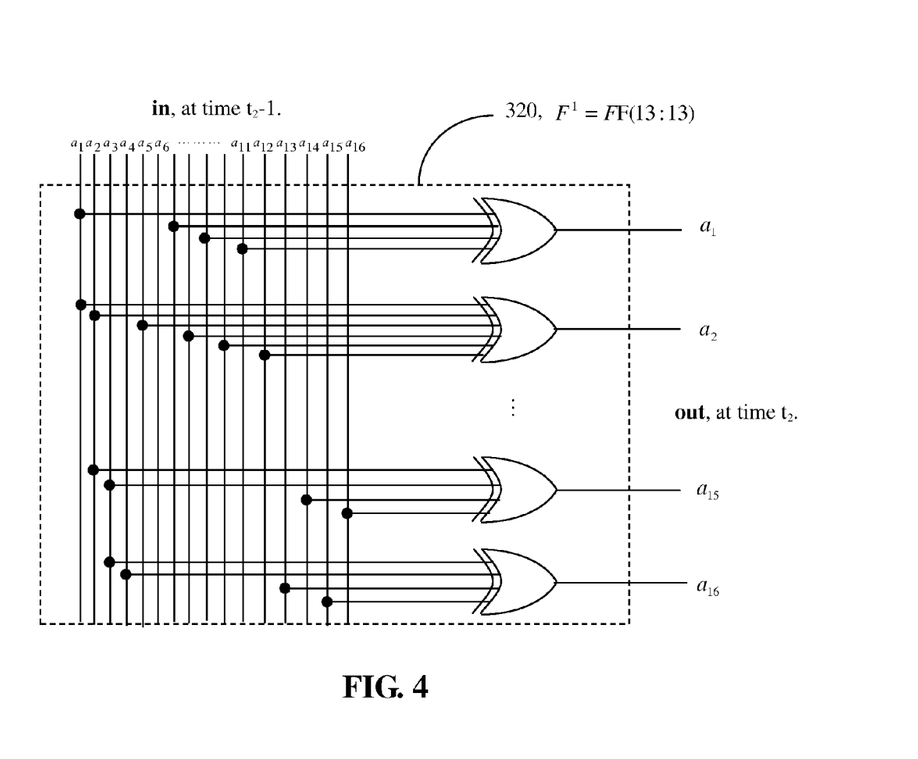
FIG. 4 is a summary schematic diagram of preferred Embodiment I showing a diffusion-table in hardware architecture according to the present invention.

According to Embodiment I in a parallel process, a medium-constant $BF^1 = BF(13:13) = [1011001101100011]$ and a diffusion-table $F^1 = FF(13:13)$, see Table 3, are generated in advance; therefore, to gain more acceleration, it would write $BF^1$ to M1, and transform the diffusion-table $F^1$ into a diffuser DF combined with a number of XOR gates shown as FIG. 4; further, in Embodiment II, write $BF^2 = BF(13^2:13) = [0110100110110010]$ to M1, and transform $F^2 = FF(13^2:13)$, see Table 4, into a diffuser DF; in Embodiment III, $BF^1 = BF(8:8) = [1010001000100100]$ to M1, and $F^1 = FF(8:8)$, see Table 5, into a diffuser DF.

Figure 5:
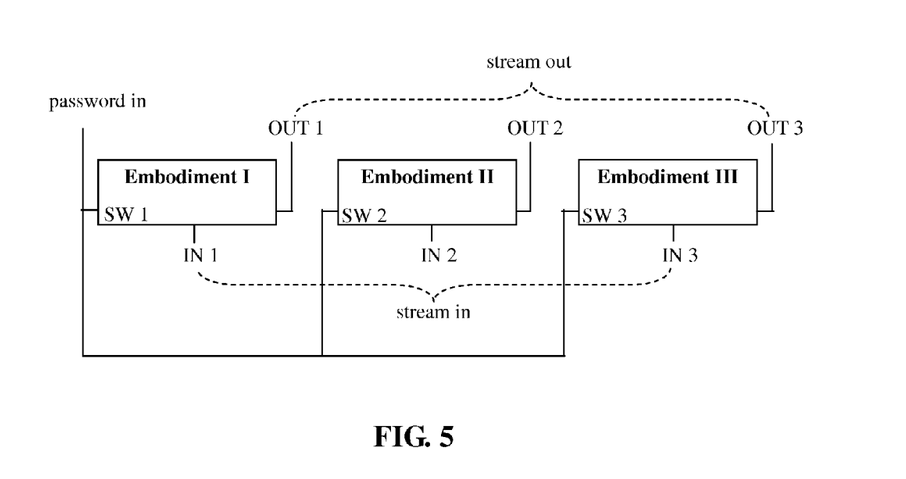
FIG. 5 is a summary schematic diagram of preferred Embodiments showing a parallel connecting in hardware architecture according to the present invention.
Figure 6:
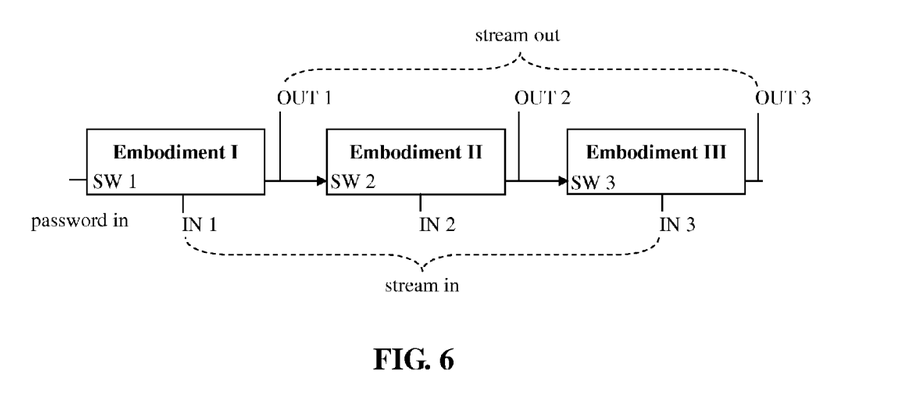
FIG. 6 is a summary schematic diagram of preferred Embodiments showing a serial connecting in hardware architecture according to the present invention.

The above preferred embodiments are not only able to be applied separately, but also, can be taken as a whole. For example, as a number of parallel connections as FIG. 5, every SW, provided for receiving a password in sequence; every IN, provided for receiving an assigned part of a plaintext/ciphertext in sequence; and every OUT, provided for transmitting the assigned part of the ciphertext/plaintext in sequence. In addition, as a number of serial connections as FIG. 6, comprises of: the first SW, provided for receiving the password in sequence, further, the former OUT, connecting to the latter SW; every IN, provided for receiving an assigned part of a plaintext/ciphertext in sequence, and every OUT, provided for transmitting the assigned part of the ciphertext/plaintext in sequence; or for more security, only encrypting or decrypting a plaintext/ciphertext stream in Embodiment III.

In summation of the above description, the present invention herein complies with the constitutional, statutory, regulatory and treaty, patent application requirements and is herewith submitted for patent application. However, the description and its accompanied drawings are used for describing preferred embodiments of the present invention, and it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A stream cryptographic method comprising:
a communication channel between a first computer and a second computer;
a diffusion-area A, wherein A contains an initial value $A^0$ and further, is a $d_1 \times d_2 \times \ldots \times d_m$ binary matrix with a combination of positions labeled sequentially from 1 to n;
a diffusion mechanism $F^{t_1}$ applied to A, notated $AF^{t_1}$ in abbreviation, wherein $AF^{t_1}=AF(p_1, p_2^{t_1}, \ldots, p_k)$;
a diffusion-medium S, wherein S is a m-dimensional binary matrix which includes an anchor positon $\dot{S}$;
and further, comprising steps of:
(I) generating, by the first and the second computers, and assigned bit for steam encryption/decryption by:
(a) setting $t_2=1$, $A^{t_1 \times (t_2-1)}=A^0$;
(b) obtaining a new value $A^{t_1 \times t_2}$, wherein $A^{t_1 \times t_2-1)}F^{t_1}$, further comprising steps of:
(i) setting t=1;
(ii) setting s=1;
(iii) letting $A^{t_2-1}=A$, and performing A with a diffusion function $F(p_s)$, whrein S overlaps A by $\dot{S}$ anchoring to the position $p_s$ transforming into m-dimension coordinates $(i_1, i_2, \ldots, i_m)$, then $AF(p_s)=A \oplus Ad_{1i} \oplus \ldots \oplus Ad_{mi} \oplus S$, $1 \leq p_s \leq n$;
(iv) if s=k, then going to next step; otherwise, s=s+1, going back to Step(iii);
(v) if t≠$t_1$, then t=t+1, going to Step(ii);
(c) outputting the assigned bit of $A^{t_1 \times t_2}$;
(II) encrypting, by the first computer, a bit of a plaintext stream in sequence, wherein the bit of the plaintext stream XORs with the assigned bit of $A^{t_1 \times t_2}$;
(III) decrypting, by the second computer, a bit of the ciphertext stream in sequence, received from the first computer, wherein the bit of the ciphertext stream XORs with the assigned bit of $A^{t_1 \times t_2}$;
(IV) going back to Step (b), and further, letting $t_2=t_2+1$.

2. The stream cryptographic method according to claim 1, Step (a), wherein $A^0$ is generated by a password written directly to A, or by reading every password bit, such that $A^{t_1 \times t_2}=A^{t_1 33(t_2-1)}F^{t_1}$ in sequence for $A^0$, if a first value, then including S, otherwise, if a second value, then excluding S wherein S=0.

3. The stream cryptographic method according to claim 1, further providing a signal to another said method, wherein the former method, Step (c) sends the signal to the latter method, Step (b), if a first value, then including S, otherwise, if a second value, then excluding S, wherein S=0.

4. A stream cryptographic method comprising:
a communications channel between a first computer and a second computer;
a diffusion-area A, wherein A contains an initial value $A^0$ and further, is a $d_1 \times d_2 \times \ldots \times d_m$ binary matrix with a combination of positions labeled sequentially from 1 to n, accordingly, the bit values from $a_1$ to $a_n$;
a function-table $F^{t_1}$ applied to A, notated $AF^{t_1}$ in abbreviation, wherein $F^{t_1}$ has $d_1 \times d_2 \times \ldots \times d_m$ layer, and every layer is a $d_1 \times d_2 \times \ldots \times d_m$ binary matrix;
a diffusion-medium S, wherein S is a m-dimensional binary matrix which includes an anchor-position $\dot{S}$;
a medium-constant $BF^{t_1}$, wherein $BF^{t_1}=BF(p_1, p_2^{t_1}p_k)$ and B is a $D_1 \times d_2= \ldots =d_m$ zero matrix;
and further, comprising steps of;
(I) generating, by the first and second computers, an assigned bit for stream encryption/decryption by;
(a) setting $t_2=1$, $A^{t_1 \times (t_2-1)}=A^0$;
(b) obtaining the medium-constant $BF^{t_1}$, further comprising steps of:
(i) setting t=1;
(ii) setting s=1;
(iii) performing B with a diffusion function $F(p_s)$, namely $BF(p_s)$, wherein S overlaps B by $\dot{S}$ anchoring to the position $p_s$ transforming into m-dimension coordinates $(i_1, i_2, \ldots, i_m)$, then $BF(p_s)=B \oplus Bd_{1i} \oplus Bd_{2i} \oplus \ldots \oplus Bd_{mi} \oplus S$, $1 \leq p_s \leq n$;
(iv) if s=k, then going to next step; otherwise, s=s+1, going back to Step (iii)
(v) if t≠$t_1$, then t=t+1, going back to Step (ii),
(c) obtaining a new value $A^{t_1 \times t_2}$, wherein $A^{t_1 \times t_2}=A^{t_1 \times (t_2-1)}F^{t_1} \oplus BF^{t_1}$, wherein $A^{t_1 \times (t_2-1)}F^{t_1}$ obtains new $a_i$, $1 \leq n$, by XORing with said layers having value 1 at position i, wherein the $i^{th}$ layer represent $a_i$;
(d) outputting an assigned bit of $A^{t_1 \times t_2}$;
(II) encrypting, by the first computer, a bit of a plaintext stream in sequence, wherein the bit of the plaintext stream XORs with the assigned bit of $A^{t_1 \times t_2}$;
(III) decrypting, by the second computer, a bit of the ciphertext stream in sequence, received from the first computer, wherein the bit of the ciphertext steam XORs with the assigned bit of $A^{t_1 \times t_2}$;
(IV) going to Step (c), and further, ; letting $t_2=_2+1$.

5. The stream cryptographic method according to claim 4, Step (c) wherein $F^{t_1}=FF(p_1, p_2^{t_1}, \ldots, p_k)$ generated once, comprising steps of:
(i) setting F is a zero matrix and 1's at the $i^{th}$ position on the $i^{th}$ layer;
(ii) setting t=1;
(iii) setting s=1;
(iv) performing F with a diffusion function $F(p_s)$, namely $FF(p_s)$, wherein $p_s$ is transformed into m-dimension coordinates $(i_1, i_2, \ldots, i_m)$, then $FF(p_s)=F \oplus Fd_{1i} \oplus Fd_{2i} \oplus \ldots \oplus Fd_{mi}$, $1 \leq p_s \leq n$;
(v) if s=k, then going to next step; otherwise, s=s+1, going back to Step (iv);
(vi) if t≠$t_1$, then t=t+1, going to back Step (iii).

6. The stream cryptographic method according to claim 4, Step (a), wherein $A^0$ is generated by a password written directly to A, or by reading every password bit, such that $A^{t_1 \times t_2} = A^{t_1 \times (t_2-1)} F^{t_1} \oplus BF^{t_1}$ in sequence for $A^0$, if a first value, then including $BF^{t_1}$, otherwise, if a second value, then excluding $BF^{t_1}$ wherein $BF^{t_1}=0$.

7. The stream cryptographic method according to claim 4, further providing a signal to another said method, wherein the former method, Step (d) sends the signal to the latter method, Step(c), if a first value, then including $BF^{t_1}$, otherwise, if a second value, then excluding $BF^{t_1}$ wherein $BF^{t_1}=0$.

8. A stream cryptographic apparatus comprising of:
   a first register R1 provided for storing an input value $A^{t_1 \times (t_2-1)}$;
   a diffuser DF provided for receiving $A^{t_1 \times (t_2-1)}$ from the first register R1, further, recombining $A^{t_1 \times (t_2-1)}$ with a function-table $F^{t_1}$ and transmitting an output value $A^{t_1 \times t_2} = A^{t_1 \times (t_2-1)} F^{t_1}$;
   a second register R2 provided for receiving and buffering $A^{t_1 \times t_2}$ from the diffuser DF, then, feeding back said $A^{t_1 \times t_2}$ to the first register R1;
   a multiplexer MUX provided for receiving $A^{t_1 \times t_2}$ from the second register R2, further, selecting an assigned bit of $A^{t_1 \times t_2}$ and transmitting the assigned bit;
   a third register R3 provided for storing a plaintext/ciphertext stream in sequence, the third register R3 input marked IN, and transmitting a bit each time;
   an XOR gate provided for receiving said assigned bit from the multiplexer MUX as a first operand, said bit from the third register R3 as a second operand, then, performing an exclusive or operation and transmitting an output bit; the output marked OUT.

9. The stream cryptographic apparatus according to claim 8, the first register R1 further provided for storing an initial value $A^0$ written directly by a password.

10. The stream cryptographic apparatus according to claim 8, further comprising of:
   a first memory M1 provided for storing a medium-constant $BF^{t_1}$;
   an XOR Unit provided for receiving $A^{t_1 \times t_2}$ from the diffuser DF as a first operand, the medium-constant $BF^{t_1}$ from the first memory M1 as a second operand, then, performing an bitwise exclusive or operation and transmitting an output value $A^{t_1 \times t_2} = A^{t_1 \times t_2} \oplus BF^{t_1}$;
   the second register R2 provided for receiving and buffering $A^{t_1 \times t_2}$ from the XOR Unit, then, feeding back said $A^{t_1 \times t_2}$ to the first register R1;
   a switch SW provided for receiving a password in sequence and performing said $F^{t_1}$ recombination, further checking the bit if a first value, then the second register R2 receiving from the diffuser DF, if a second value, then the second register R2 receiving from the XOR Unit.

11. The stream cryptographic apparatus according to claim 10, the first register R1 further provided for storing an initial value $A^0$ by the switch SW receiving the password in sequence.

12. The stream cryptographic apparatus according to claim 10, further provided for a parallel connecting to another said apparatuses, comprising of:
   every apparatus, the switch SW, provided for receiving a password in sequence;
   every apparatus, the third register R3 input IN, provided for receiving an assigned part of a plaintext/ciphertext in sequence;
   every apparatus, the XOR gate's output OUT, provided for transmitting the assigned part of the ciphertext/plaintext in sequence.

13. The stream cryptographic apparatus according to claim 10, further provided for a serial connecting to another said apparatuses, comprising of:
   the first apparatus, the switch SW, provided for receiving a password in sequence;
   the last apparatus, the third register R3 input IN, provided for receiving a plaintext/ciphertext in sequence;
   the last apparatus, the XOR gate's output OUT, provided for transmitting the ciphertext/plaintext in sequence;
   every apparatus except the first one, the switch SW, provided for receiving the output from the former apparatus, the XOR gate's output OUT;
   every apparatus except the last one, the XOR gate's output OUT, provided for transmitting the output to the latter apparatus, the switch SW.

14. The stream cryptographic apparatus according to claim 13, further comprising of:
   every apparatus, the third register R3 input IN, provided for receiving an assigned part of a plaintext/ciphertext in sequence;
   every apparatus, the XOR gate's output OUT, provided for transmitting the assigned part of the ciphertext/plaintext in sequence.

* * * * *